United States Patent [19]

de Kock

[11] 3,937,307
[45] Feb. 10, 1976

[54] ARRANGEMENT FOR ADJUSTING THE DAMPING FORCE OF A SHOCK ABSORBER

[75] Inventor: Cornelis de Kock, Oud-Beijerland, Netherlands

[73] Assignee: ITT Industries, Inc., New York, N.Y.

[22] Filed: Oct. 11, 1974

[21] Appl. No.: 514,172

[30] Foreign Application Priority Data

Oct. 12, 1973 Netherlands............... 7314047

[52] U.S. Cl.................. 188/319; 188/300
[51] Int. Cl.² ........................... F16F 9/34
[58] Field of Search ......... 188/285, 278, 300, 310, 188/319, 322

[56] References Cited
UNITED STATES PATENTS

| | | | |
|---|---|---|---|
| 2,182,016 | 12/1939 | Deutsch | 188/319 |
| 2,335,907 | 12/1943 | Boor et al. | 188/319 |
| 2,487,472 | 11/1949 | Patriquin | 188/319 |
| 3,827,538 | 8/1974 | Morgan | 188/319 |

Primary Examiner—Trygve M. Blix
Assistant Examiner—Edward R. Kazenske
Attorney, Agent, or Firm—J. B. Raden; D. P. Warner

[57] ABSTRACT

An arrangement is provided for adjusting the damping force exhibited by a hydraulic shock absorber. Included is a valve near the piston including passages permitting the flow of fluid through openings in the piston. A linkage is provided which is rotatable about the piston rod to close any or all of the passages through the valve and thus regulate the damping force. The position of the linkage is determined by the interaction of the linkage with a stop member and the piston rod. The stop member is an element which may be extended through one end of the cylinder to engage an extension of the linkage to hold it in place while the piston rod bearing the valve is turned to open or close openings in the valve and thus change the damping force the shock absorber can exert. The stop member is adaptable to be retracted from contact with the linkage so that the adjustment will not be disturbed. Click-stops are provided between elevations on the linkage and apertures affixed to the end of the piston to provide "feel" and perceptible noise to indicate intermediate positions have been reached.

11 Claims, 4 Drawing Figures

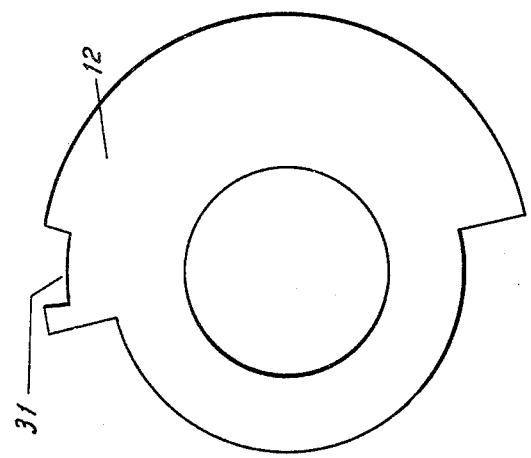
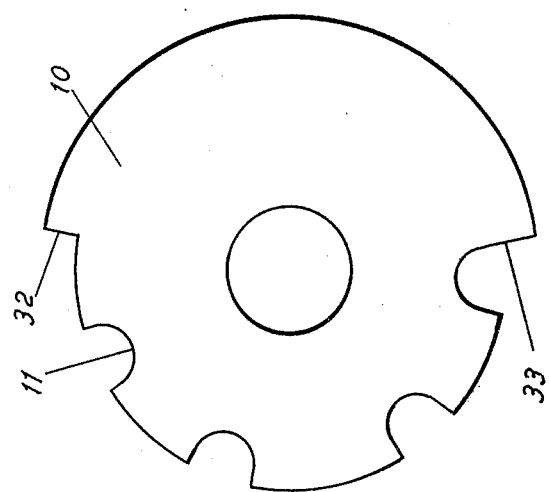
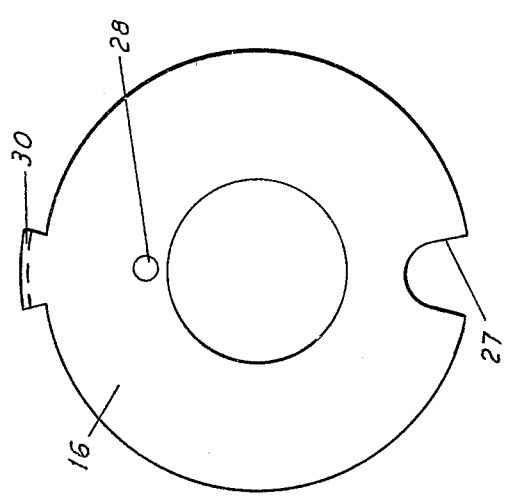

ARRANGEMENT FOR ADJUSTING THE DAMPING FORCE OF A SHOCK ABSORBER

BACKGROUND OF THE INVENTION

1. Field of the Invention.

The invention relates to an arrangement for adjusting the damping force on the piston of a hydraulic telescopic shock absorber having a cylinder in which the piston is movable by a piston rod and the damping force is determined by the position of a closure member that acts upon a passage in the piston. The invention enables the position of the closure member to be influenced by bringing an adjusting member in an end position of the piston in engagement with a stop member installed near the cylinder end surface, through which by turning the piston by means of the piston rod the turning along of the adjusting member is prevented and the position of the closure member relative to that of the piston may be changed. Means are also provided to bring the stop member out of reach of the adjusting member when desired to render the adjusting device inoperative.

2. Description of the Prior Art.

Such a device is known from the German Auslegeschrift 1.251.593, which matured on Apr. 4, 1968 into a patent having the same number U.S. Pat. No. 1,251,593. In this an adjusting device for a hydraulic shock absorber is described which uses a stop member situated on the inside of the cylinder and which engages an adjusting member connected to the piston during the adjusting in an end position of the piston. After having completed the adjustment, further engagement of the stop member and adjusting member is made impossible by additional parts. In this way, unwanted adjustment later on by an unqualified person or during the fitting in of the shock absorber in a vehicle is prevented in an excessive way.

However, this well known device has the disadvantage that the means to position the stop member out of reach of the adjusting member are formed by means which obstruct a part of the useful stroke of the shock absorber. A second disadvantage is that later readjustment of the damping force is not possible in a simple way, as the shock absorber has to be disassembled partly. Further, only one end position may be recognized perceptibly during the adjustment. Perceptible recognizable intermediate positions are not available.

SUMMARY OF THE INVENTION

It is therefore an object of the present invention to provide an adjusting device for the damping force of a shock absorber which avoids the above disadvantages. The device according to the invention is for that purpose characterized in that the stop member is installed axially movable between two end positions in a shock absorber's cylinder end surface to render the device operative or inoperative, respectively, that the stop member in one of the end positions can be made to engage with a recess of the adjusting member, that the adjusting member is provided with an axially directed part along its periphery, which is in engagement with a recess in the outline of the closure member and that the adjusting member is pressed by means of a spring into the direction of the cylinder end surface against a stop ring firmly connected to the piston.

BRIEF DESCRIPTION OF THE DRAWINGS

The advantages of construction according to the invention will be explained further with reference to a manufactured example shown in the related drawings, in which FIGS. 2, 3 and 4 show separate parts of the adjusting device applied in the shock absorber as shown in FIG. 1.

Description of Preferred Embodiments

Figure 1:
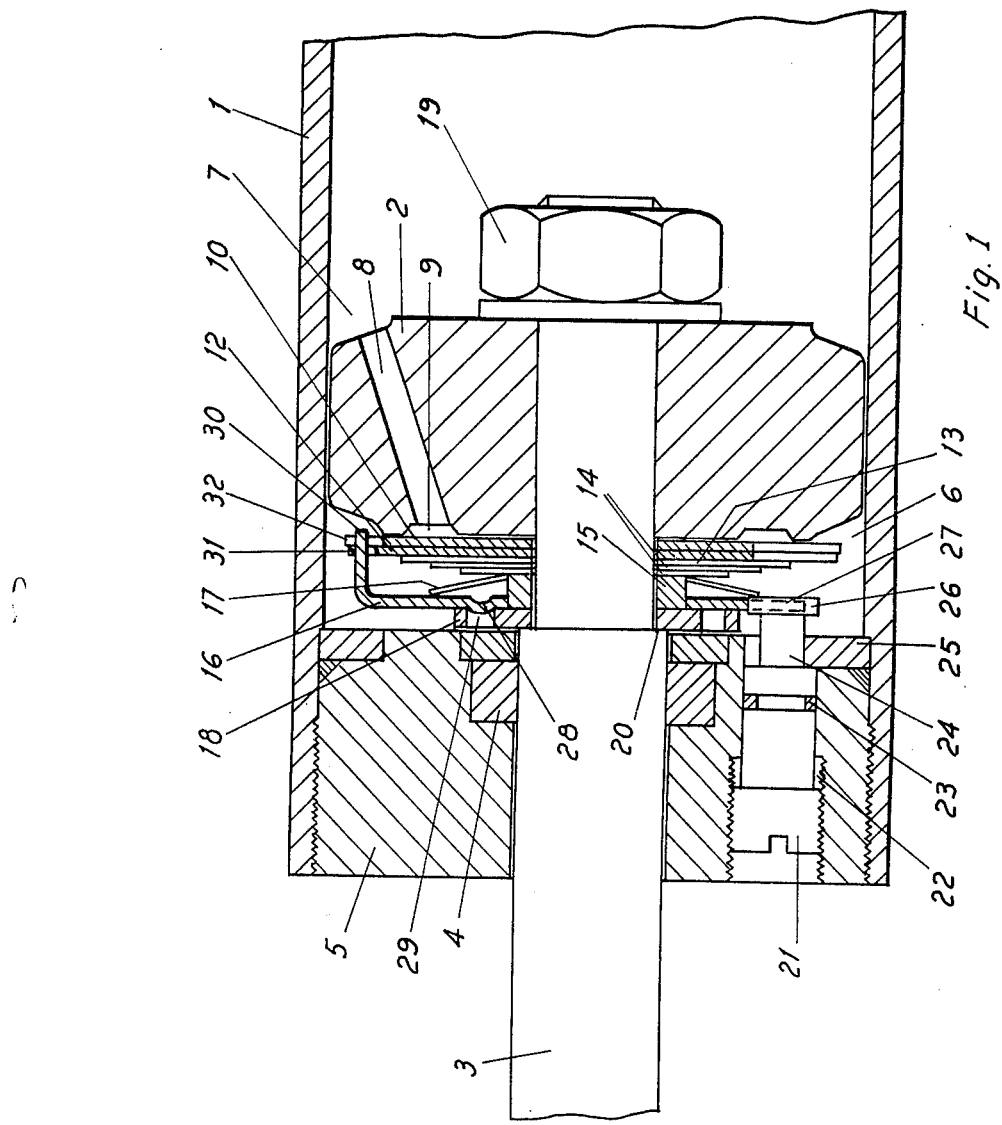
FIG. 1 represents a partial longitudinal section of a hydraulic telescopic shock absorber in which an adjusting device is installed according to the invention and which is shown in the operative position.

In FIG. 1, 1 is the cylinder of a hydraulic telescopic shock absorber in which a piston 2 and a piston rod 3 are movable.

The piston rod is at one side let outside the cylinder via a sealing ring 4 through a cylinder end piece 5. The piston 2 divides the cylinder in two cylinder chambers or rooms 6 and 7 and is provided with one or more passages 8 connecting the two chambers, which passages terminate in a ring-shaped opening 9, which in the rest position of the piston is covered by a ring-shaped valve 10 made of resilient material, through which one or more recesses (11 in FIG. 4) leave the opening 9 uncovered. On the valve 10, there lies a slab-shaped closure member 12 (FIG. 3) also made of resilient material. The closure member 12 is positioned on the piston rod by means of a distance or spacing ring 13, and is pressed in the direction of the valve 10 by one or more ring-shaped springs 14 to enable it to cover the recesses 11 of the valve 10 with a part of its surface.

A distance or spacing ring 15 centers an adjusting member 16 which is pressed toward a stop ring 18 by means of a ring-shaped spring 17.

The valve 10, the distance ring 13, the springs 14, the distance ring 15 and the stop ring 18 are locked in the axial direction between piston 2 and a shoulder 20 on the piston rod 3, the closure member 12 being rotatable relative to the distance ring 13 by sliding against the ring 13. The adjusting member 16 is rotatable around the distance ring 15 by sliding against the outer periphery thereof.

In the cylinder end piece 5, a stop member 21 is axially movable along screwthread 22 and is closed with a sealing ring 23 with respect to the cylinder chamber 6. The stop member 21 is further provided with a recessed part 24, which can move along a ring 25 which is clamped between the cylinder 1 and the cylinder end piece 5, which ring forms stops for the end positions of the member 21. In the end position of the stop member 21, shown in FIG. 1, the end 26 of the stop member 21 reaches into a recess 27 of the adjusting member 16 (FIG. 2). The adjusting member is furthermore provided with a locally placed elevation 28 which is in engagement with one of the apertures 29 of the stop ring 18.

An axially directed part 30 extending from the edge of the adjusting member 16 reaches through a recess 31 on the edge of the closure member 12 (FIG. 3) till past the valve 10, enabling it to lodge against one of the stops 32 or 33 (FIG. 4) providing end positions for the adjusting member.

The size of the passage through the piston, determined by the degree to which the recesses 11 of the valve 10 remain uncovered by the closure member 12, can now be adjusted as follows.

The piston 2 is brought to the end position by means of the piston rod 3 as shown in FIG. 1. The adjusting member 16 may then push against the end 26 of the stop member 21, if the recess 27 of the adjusting member 16 is not positioned opposite the end of the stop member. In this case, the adjusting member 16 is pressed in the direction of the piston against the action of the spring 17.

In the following revolution of the piston rod with the piston and the other parts clamped in between, the adjusting member 16 will rotate until the recess 27 comes to the place of the stop member 21 after which under the influence of the spring 17 the adjusting member is caused to lie against the stop ring 18 again and then to lag behind. By that action also the closure member 12 will be restrained from further rotation with the piston so that it will cover, more or less, the recesses 11 of the valve 10.

The angle through which revolution may take place is limited by the stops 32 and 33 of the valve 10, against which the part 30, on the periphery of the adjusting member 16, lodges in both the end positions.

During the adjustment described, the elevation 28 on the adjustment member 16 will contact the apertures 29 in the stop ring 18, to provide a perceptible noise and "feel" to indicate that "click stops" denoting intermediate positions have been reached.

To render the device inactive, i.e., the adjustment mechanism inoperative, the stop member 21 is moved along the screwthread 22 until the end 26 of the stop member pushes against the ring 25. The stop member is then out of reach of the adjusting member. Instead of equipping it with screwthreads it is also possible to put the stop member under such a spring effect, that the member is kept out of reach of the adjusting member in the inactive position of the device. To put the adjusting device in the active position the stop member must then be pressed in the direction of the piston.

In case of application of the latter construction in a gas-filled shock absorber the stop member will be held in the inactive position by the gas pressure present in the cylinder so that a spring may be dispensed with.

Especially in such a shock absorber, where the piston is in the totally outstretched position in the unloaded situation, there is no chance of an unwanted adjustment.

The adjustment device is placed in this example on the piston rod side of the shock absorber. It will be clear that the device can also be applied on the opposite bottom side of a shock absorber, by which the adjustment can take place in the compressed end position of the piston.

While the principles of the invention have been described above in connection with specific apparatus and applications, it is to be understood that this description is made only by way of example and not as a limitation on the scope of the invention.

I claim:

1. An arrangement for adjusting the damping force on the piston of a hydraulic telescopic shock absorber, comprising a closed cylinder, a piston within said cylinder, a piston rod connected to the piston and extending outside the cylinder, a closure member and valve operable together to restrict a passage through the piston, an adjusting member to control the closure member and thereby regulate the restriction of said passage, a stop member installed to extend through one end of the cylinder and axially movable between two end positions in the cylinder end, said stop member in one of the end positions engaging a recess of the adjusting member to enable adjustment of the adjusting member, said stop member in the other end position being withdrawn from possible engagement with the adjusting member, said adjusting member supporting an axially directed part which is in engagement with a recess in the closure member to enable variation of restriction in the passage through the piston and thereby regulation of the damping force.

2. The invention according to claim 1, in which the closure member includes a circular plate having a reduced radius over a part of its outline and which lies on a plate-shaped, resilient valve with openings formed by recesses which may be closed more or less by the closure member under the influence of the adjusting member.

3. The invention according to claim 1, in which the adjusting member is provided with a local elevation which may engage in one of a number of recesses in a stop ring, fixed concentrically with respect to the piston.

4. The invention according to claim 2, in which the resilient valve is equipped with a recess over a part of its outline of which the ends form stops for the axially directed part of the outline of the adjusting member which may move in the recess.

5. The invention according to claim 4, in which the stop member has a smaller section over a part of its length providing a recess in which engages a ring, firmly connected to the cylinder, which ring limits the axial displacement of the stop member with respect to both end positions.

6. The invention according to claim 1, in which the stop member is movable between both end positions by means of a screwthread.

7. An arrangement for adjusting the damping force on the piston of a hydraulic telescopic shock absorber, comprising a cylinder having closed ends in which a piston is movable in response to forces applied to a piston rod attached thereto and in which damping force on the piston is a function of the forces applied and of fluid flow in a passage through the piston, a ring-shaped valve including a plurality of orifices adaptable to regulate fluid flow through the passage in the piston, a closure member adaptable to close one or more of the orifices in said valve, an adjusting member rotatably mounted on said piston rod, and a stop member extending through one end of said cylinder to enable setting the stop member from outside the cylinder, said adjusting member including means responsive to engagement by the stop member to be held in a fixed position relative to the cylinder, said adjusting member including means controlling motion of the closure member to thereby vary the permissible flow of fluid through said passage and to alter the damping force.

8. The invention as claimed in claim 7 in which the stop member is adaptable to be extended into the cylinder and to be retracted from within the cylinder, said stop member in its extended position being engageable with said adjusting means to thereby enable adjustment of the opening in the passage through the piston and said stop member in its retracted position being out of reach of the adjusting means to prevent accidental misadjustment of the adjusting means.

9. The invention as claimed in claim 7, in which the ring-shaped valve is mounted adjacent to the piston and includes a plurality of orifices positioned to regulate fluid flow through the passage in the piston.

10. The invention as claimed in claim 9, in which the closure member is rotatably mounted on said piston rod adjacent to the valve and includes means to close one or more orifices of said valve.

11. The invention as claimed in claim 10, in which the ring-shaped valve includes a plurality of stops by which the adjusting member can be prevented from rotating with respect to the piston, the closure member includes a recess by which it can be prevented from rotating with respect to the adjusting member and the adjusting member includes means to engage the stops in the valve and the recess in the closure member to thereby control the rotation of the closure member when the piston rod is turned and thus to vary the opening in the passage in the piston and the damping force.

* * * * *